US 7,874,685 B2
Jan. 25, 2011

(12) United States Patent
Miyazawa

(10) Patent No.: US 7,874,685 B2
(45) Date of Patent: Jan. 25, 2011

(54) PROJECTION SYSTEM, PROJECTOR, AND INFORMATION PROCESSING DEVICE

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 767 days.

(21) Appl. No.: 11/553,721

(22) Filed: Oct. 27, 2006

(65) Prior Publication Data
US 2007/0109504 A1 May 17, 2007

(30) Foreign Application Priority Data
Nov. 16, 2005 (JP) ............................. 2005-331450

(51) Int. Cl.
G03B 21/00 (2006.01)
G03B 21/16 (2006.01)
G03B 21/18 (2006.01)
G03B 21/26 (2006.01)

(52) U.S. Cl. ..................... 353/122; 353/52; 353/57; 353/94

(58) Field of Classification Search .................. 353/52, 353/57, 61, 122, 94; 315/86, 160–161, 411; 372/29.012, 29.021, 38.04
See application file for complete search history.

(56) References Cited

U.S. PATENT DOCUMENTS

| 5,847,748 | A * | 12/1998 | Laughlin ..................... 725/105 |
| 7,086,739 | B2 * | 8/2006 | Kida et al. ..................... 353/52 |
| 7,178,941 | B2 * | 2/2007 | Roberge et al. ............. 362/225 |
| 7,303,282 | B2 * | 12/2007 | Dwyer et al. .................. 353/15 |
| 7,441,903 | B2 * | 10/2008 | Kim ............................. 353/61 |
| 7,500,758 | B1 * | 3/2009 | Adachi et al. ............... 353/101 |
| 7,641,348 | B2 * | 1/2010 | Yin et al. ..................... 353/119 |
| 2005/0030494 | A1 * | 2/2005 | Kumai ......................... 353/119 |
| 2005/0151933 | A1 * | 7/2005 | Tsai et al. ..................... 353/57 |
| 2007/0229780 | A1 * | 10/2007 | Yang et al. .................. 353/119 |

(Continued)

FOREIGN PATENT DOCUMENTS

CN 1570758 A 1/2005

(Continued)

OTHER PUBLICATIONS

"iPod: User's Manual", Apple Corp., http://web.archive.org/web/20021110134913/http://manuals.info.apple.com/Apple_Support_Area/Manuals/hardware/034214 1iPodUserGuideMac.PDF, Year Published/Copyrighted: 2002, Website Publication Date: Nov. 10, 2002.*

*Primary Examiner*—Georgia Y Epps
*Assistant Examiner*—Jori S Reilly-Diakun
(74) *Attorney, Agent, or Firm*—Oliff & Berridge, PLC

(57) ABSTRACT

A projection system includes an information processing device for processing image information, a projector for modulating a light beam emitted from a light source device in accordance with the image information processed by the information processing device and enlargedly projecting the modulated light beam, and an information transfer section for connecting the information processing device and the projector to each other so as to communicate information. The projector includes, a cooling device for cooling internal heat generator, and a power generation section for supplying at least the cooling device with a drive voltage based on the electric power supplied via the electric power transmission path. The information processing device includes a cooling device control section for generating a control instruction for performing drive control of the cooling device and for outputting the control instruction to the cooling device via the information transfer section.

12 Claims, 7 Drawing Sheets

U.S. PATENT DOCUMENTS

2007/0282564 A1* 12/2007 Sprague et al. ............. 702/141

FOREIGN PATENT DOCUMENTS

| JP | 05-257542 A | 10/1993 |
| JP | A 2004-069997 | 3/2004 |
| JP | 2005227478 A * | 8/2005 |
| KR | 2003-0062898 A | 7/2003 |

\* cited by examiner

PROJECTION SYSTEM, PROJECTOR, AND INFORMATION PROCESSING DEVICE

BACKGROUND

1. Technical Field

The present invention relates to a projection system, a projector, and an information processing device.

2. Related Art

In the past, a projector provided with a light source device, a light modulation device for modulating the light beam emitted from the light source in accordance with image information, and a projection optical device for enlargedly projecting the modulated light beam has been known.

In such a projector, the light source device, which generates heat while emitting lights is apt to be heated to a high temperature. Therefore, the projector in the related art is equipped with a cooling device for cooling the light source device, such as a cooling fan. Thus, the cooling device is driven for a predetermined period after powering off the projector (lighting-out of the light source device) to cool the light source device.

Meanwhile, in the projector of the related art, the power supplied from an external power supply through an AC cable is generally supplied to each of various internal components (e.g., a light source device or a cooling device). Therefore, if the AC cable is mistakenly unplugged from the projector or an outlet while the light source device is lighted or immediately after the light source device is lighted out, driving of the cooling device is stopped to problematically cause the light source device to be damaged or the components inside the projector to have problems.

Further, a projection system provided with a personal computer (hereinafter abbreviated as PC) for performing shape correction or color correction of the image source, a projector for projecting the image corrected by the PC on a screen, and a serial cable, such as a universal serial bus (USB), for connecting between the PC and the projector so as to communicate data is known (see, for example, JP-A-2004-69997).

In the projection system described in JP-A-2004-69997, the projector is provided with a built-in battery, whereby allowing the built-in battery to supply each of the components of the projector with electric power. According to such a configuration, even in the case in which the AC cable is mistakenly unplugged from the projector or an outlet while the light source device is lighted or immediately after the light source device is lighted out, it becomes possible to drive the cooling device by the built-in battery, thus making it possible to solve the problem described above.

However, the projection system described in JP-A-2004-69997 needs to be provided with the built-in battery in the projector, and accordingly, has a problem that it is difficult to reduce the cost of the projector.

Therefore, there is a demand for a technology capable of driving the cooling device even in the condition in which the power supplied to the projector from the external power supply is stopped while reducing the cost of the projector.

SUMMARY

An advantage of some aspects of the invention is to provide a projection system, a projector, and an information processing device capable of driving a cooling device even in the condition in which the power supplied to the projector from an external power supply is stopped while allowing the cost of the projector to be reduced.

According to an aspect of the invention, there is provided a protection system including an information processing device for processing image information, a projector for modulating a light beam emitted from a light source device in accordance with the image information processed by the information processing device and enlargedly projecting the modulated light beam, and an information transfer section for connecting the information processing device and the projector to each other so as to communicate information, wherein the information transfer section includes an electric power transmission path capable of supplying electric power from a processing device power supply section to the projector, the projector includes, a cooling device for cooling internal heat generator, and a power generation section for supplying at least the cooling device with a drive voltage based on the electric power supplied via the electric power transmission path, and for supplying another component excluding at least the cooling device with a drive voltage based on the electric power supplied from an external power supply, the information processing device includes a cooling device control section for generating a control instruction for performing drive control of the cooling device and for outputting the control instruction to the cooling device via the information transfer section.

Here, as the heat generator inside the projector, for example, a light source device can be exemplified.

In this aspect of the invention, in a normal drive condition in which the electric power generation section is supplied with the electric power from the external power supply via the AC cable or the like, and the electric power also supplied from the information processing device via the electric power transmission path of the information transfer section, the electric power generation section in the projector supplies at least the cooling device with the drive voltage based on the electric power from the information processing device via the information transfer section, and supplies another component excluding at least the cooling device with the drive voltage based on the external power supply. Accordingly, if the AC cable and so on are mistakenly unplugged from the projector or the outlet while the light source device is lighted or right after the light source device is lighted out in the normal drive condition, and the electric power supplied to the projector from the external power supply is stopped, it becomes possible to drive at least the cooling device based on the electric power from the information processing device via the information transfer section, thus the cooling of the light source device as the heat generator after lighted out can be performed. Further, according to such a configuration, there is no need for providing the built-in battery in the projector as required in the background art, thus enhancing the cost reduction of the projector.

Further, since the information processing device is provided with the cooling device control section, drive control of the cooling device can be performed in the information processing device side by transferring the control instruction to the projector side via the information transfer section. Accordingly, the configuration for performing drive control of the cooling device in the projector side can be eliminated, thus simplifying the circuit configuration inside the projector, thereby enhancing cost reduction of the projector. Further, the drive control of the cooling device can be performed in the information processing device side even in the case in which the power to be supplied to the projector from the external power supply is blocked, thus cooling of the light source device after lighting-out can efficiently be performed.

In the projection system according to another aspect of the invention, the projector includes a temperature detection section for detecting temperature in the vicinity of the heat generator, the power generation section supplies the temperature detection section with the drive voltage based on the electric power supplied via the electric power transmission path, and the cooling device control section obtains temperature information regarding the temperature in the vicinity of the heat generator detected by the temperature detection section via the information transfer section, generates the control instruction for performing drive control of the cooling device based on the temperature information, and preferably outputs the control instruction to the cooling device via the information transfer section.

In this aspect of the invention, the cooling device control section performs drive control of the cooling device based on the temperature information regarding the temperature in the vicinity of the heat generator obtained from the projector side via the information transfer section. Accordingly, the temperature of the light source device as the heat generator can efficiently be reduced to the target temperature. Further, by performing drive control of the cooling device based on the temperature in the vicinity of the light source device, the cooling device can be driven with minimum necessary drive force without unnecessarily increase the drive force of the cooling device, thus the sound caused by driving the cooling device can be reduced, the silentness of the projector can be assured.

In the projection system according to another aspect of the invention, the projector includes a temperature detection section for detecting temperature in the vicinity of the heat generator, the power generation section supplies the temperature detection section with the drive voltage based on the electric power supplied via the electric power transmission path, and the information processing device preferably includes, a necessary drive period calculation section for obtaining the temperature information regarding the temperature in the vicinity of the heat generator detected by the temperature detection section via the information transfer section, and for calculating a necessary drive period for driving the cooling device for cooling the heat generator based on the temperature information, and an annunciation control section for making an annunciation section announce information regarding the necessary drive period calculated by the necessary drive period calculation section.

Incidentally, in the case in which serial cable is pulled out from the information processing device or the projector without discretion prior to the termination of cooling of the light source device by the cooling device after lighting-out of the light source device as the heat generator after the AC cable and so on has mistakenly been unplugged from the projector or the outlet in the normal drive condition, the power to be supplied to the projector from the information processing device is stopped, and accordingly, it becomes difficult to drive the cooling device to cool the light source lamp.

According to this aspect of the invention, since the information processing device is provided with the necessary drive period calculating section, based on the temperature information regarding the temperature in the vicinity of the light source device as the heat generator obtained from the projector side via the information transfer section, for example, after lighting out the light source device as the heat generator, the necessary drive period for cooling the light source device can be calculated by the necessary drive period calculation section. Further, since the information processing device is provided with the annunciation control section, the annunciation control section can make the annunciation section announce the information regarding the necessary drive period. Therefore, by making the annunciation section announce the information instructing, for example, to maintain the connection state between the information processing device and the projector with the information transfer section until the necessary drive period has elapsed as the information regarding the necessary drive period, it is possible to make the user recognize the information. Therefore, it can be prevented that the serial cable and so on are pulled out from the information processing device or the projector before the cooling of the light source device by the cooling device is completed after the AC cable and so on are unplugged from the projector or the outlet, thus the light source device can preferably be cooled by the cooling device.

In the projection system according to another aspect of the invention, the information processing device preferably includes, a setting input section for allowing setting input of state switching information between that the power generation section is set to an ON state and the projector is activated and that the power generation section is set to an OFF state and drive of the projector is stopped, and a processing side power control section for generating a control instruction for setting the power generation section to one of the ON state and the OFF state based on the state switching information, and for outputting the control instruction to the power generation section via the information transfer section.

Incidentally, in the background art, the control of powering ON/OFF the projector is generally performed by the user operating the operation panel or the like provided to the projector. Accordingly, when clearing away the projector after use, the user operates the operation panel of the projector to power it OFF, and then pulls out the AC cables, the serial cables as the information transfer section, and so on from the projector and the information processing device. However, in such a configuration, the serial cables might be pulled out from the projector or the information processing device prior to the completion of cooling of the light source device by the cooling device after powering OFF the projector (lighting-out the light source device). In other words, the preferable cooling of the light source device by driving the cooling device might fail after the power supplied to the projector from the information processing device has been stopped and the light source device has been lighted out.

According to this aspect of the invention, since the information processing device is provided with the setting input section and the processing device side electric power control section, the power ON/OFF control of the projector can be performed in the information processing device side. Therefore, if it is configured that after the processing device side electric power control section performs power OFF control (lighting out of the light source device) of the projector in response to the operation of the setting input section by the user, the information instructing to maintain the connection state between the projector and the information processing device with the information transfer section, for example, is announced by the annunciation section, it is possible to surely make the user recognize the information. Therefore, it can be prevented that the serial cable and so on are pulled out from the information processing device of the projector prior to the completion of the cooling of the light source device by the cooling device after powering OFF (lighting-out the light source device) the projector by operating the setting input section of the information processing device, thus the light source device can preferably be cooled with the cooling device.

In the projection system according to another aspect of the invention, the projector preferably includes, a projector side connection recognition section for recognizing whether or not the projector and the information processing device are connected to each other via the information transfer section, and a projector side power control section for making the power generation section supply the cooling device with the drive voltage based on the electric power supplied from the external power supply in response the projector side connection recognition section recognizing the unconnected state.

Incidentally, in the normal drive condition, if the serial cable and so on as the information transfer section are pulled out from the information processing device and the projector by accident, the electric power supplied from the information processing device to the projector is stopped, and it become difficult to drive the cooling device to cool the light source device as the heat generator.

According to this aspect of the invention, since the projector is provided with the projector side connection recognition section and the projector side electric power control section, the projector can detect the connection state between the projector and the information processing device with the information transfer section, and if the unconnected state is recognized, the drive voltage supplied to the cooling device can be switched to the drive voltage based on the electric power supplied form the external power supply. Therefore, in the normal drive condition, if the serial cable and so on are pulled out from the information processing device or the projector by accident, the cooling device can be driven based on the electric power supplied from the external power supply to cool the light source device.

In the projection system according to another aspect of the invention, the information processing device preferably includes, a processing device side connection recognition section for recognizing whether or not the information processing device and the projector are connected to each other via the information transfer section, and an annunciation control section for making an annunciation section announce information for maintaining electric power supplying state from the external power supply in response to the processing device side connection recognition section recognizing unconnected state.

Incidentally, even in the case in which the cooling device is driven by switching the drive voltage to be supplied to the cooling device to the drive voltage based on the power supplied from the external power supply when the serial cable and so on as the information transfer section is pulled out from the information processing device and the projector by accident in the normal drive condition, when the AC cable or the like is unplugged from the projector or the outlet, the power supplied to the projector from the external power supply is to be stopped, and accordingly, the light source device as the heat generator cannot be cooled by driving the cooling device.

According to this aspect of the invention, since the information processing device is provided with a processing device side connection recognition section and the annunciation control section, the connection state between the projector and the information processing device by the information transfer section is detected, and if the unconnected state is recognized, it is possible to make the annunciation section announce the information instructing to maintain the power supply state from the external power supply. Therefore, by making the annunciation section announce, for examples the information instructing not to unplug the AC cable and so on from the projector or the outlet as the information instructing to maintain the power supply state from the external power supply, it becomes possible to make the user recognize the information. Therefore, it can be prevented that the AC cable and so on are unplugged from the projector or the outlet when the serial cable and so on are pulled out from the information processing device or the projector and the cooling device is driven based on the electric power supplied from the external power supply, the light source device can preferably be cooled by the cooling device.

According another aspect of the invention, there is provided a projector for modulating a light beam emitted from a light source device in accordance with the image information processed by the information processing device and transferred via an information transfer section, and enlargedly projecting the modulated light beam, the information transfer section including an electric power transmission path capable of supplying electric power from a processing device power supply section to the projector, comprising: a cooling device for cooling internal heat generator, and a power generation section for supplying at least the cooling device with a drive voltage based on the electric power supplied via the electric power transmission path, and for supplying another component excluding at least the cooling device with a drive voltage based on the electric power supplied from an external power supply, wherein the cooling device is driven based on a control instruction transferred from the information processing device via the information transfer section.

The projector according to another aspect of the invention, preferably includes a projector side connection recognition section for recognizing whether or not the projector and the information processing device are connected to each other via the information transfer section, and a projector side power control section for making the power generation section supply the cooling device with the drive voltage based on the electric power supplied from the external power supply in response to the projector side connection recognition section recognizing the unconnected state.

The projector according to this aspect of the invention is suitable for the projection system as described above.

According to another aspect of the invention, there is provided an information processing device for processing image information and transferring the processed image information to a projector via an information transfer section, the information transfer section including an electric power transmission path capable of supplying electric power from a processing device power supply section too the projector, the projector including a cooling device for cooling an internal heat generator, and a power generation section for supplying at least the cooling device with a drive voltage based on the electric power supplied via the electric power transmission path, and for supplying another component excluding at least the cooling device with a drive voltage based on the electric power supplied from an external power supply, and including a cooling device control section for generating a control instruction for performing drive control of the cooling device and for outputting the control instruction to the cooling device via the information transfer section.

In the information processing device according to another aspect of the invention, the projector including a temperature detection section for detecting temperature in the vicinity of the heat generator, the power generation section supplying the temperature detection section with the drive voltage based on the electric power supplied from the processing device power supply section via the electric power transmission path, and preferably including a necessary drive period calculation section for obtaining the temperature information regarding the temperature in the vicinity of the heat generator detected by the temperature detection section via the information transfer section, and for calculating a necessary drive period for driving the cooling device for cooling the heat generator based on the temperature information, and an annunciation control section for making an annunciation section announce information regarding the necessary drive period calculated by the necessary drive period calculation section.

The information processing device according to another aspect of the invention, preferably includes a setting input section for allowing setting input of state switching information between that the power generation section is set to an ON state and the projector is activated and that the power generation section is set to an OFF state and drive of the projector is stopped, and a processing side power control section for generating a control instruction for setting the power generation section to one of the ON state and the OFF state based on the state switching information, and for outputting the control instruction to the power generation section via the information transfer section.

The information processing device according to another aspect of the invention, the projector includes, a projector side connection recognition section for recognizing whether or not the projector and the information processing device are connected to each other via the information transfer section, and a projector side power control section for making the power generation section supply the cooling device with the drive voltage based on the electric power supplied from the external power supply in response the projector side connection recognition section recognizing the unconnected state, preferably includes a processing device side connection recognition section for recognizing whether or not the information processing device and the projector are connected to each other via the information transfer section, and an annunciation control section for making an annunciation section announce information for maintaining electric power supplying state from the external power supply in response to the processing device side connection recognition section recognizing unconnected state.

The information processing device according to this aspect of the invention is suitable for the projection system as described above.

BRIEF DESCRIPTION OF THE DRAWINGS

The invention will now be described with reference to the accompanying drawings, wherein like numbers refer to like elements.

DESCRIPTION OF EXEMPLARY EMBODIMENTS

An embodiment of the invention will hereinafter be explained with reference to the accompanying drawings.

1. Configuration of Projection System

Figure 1:
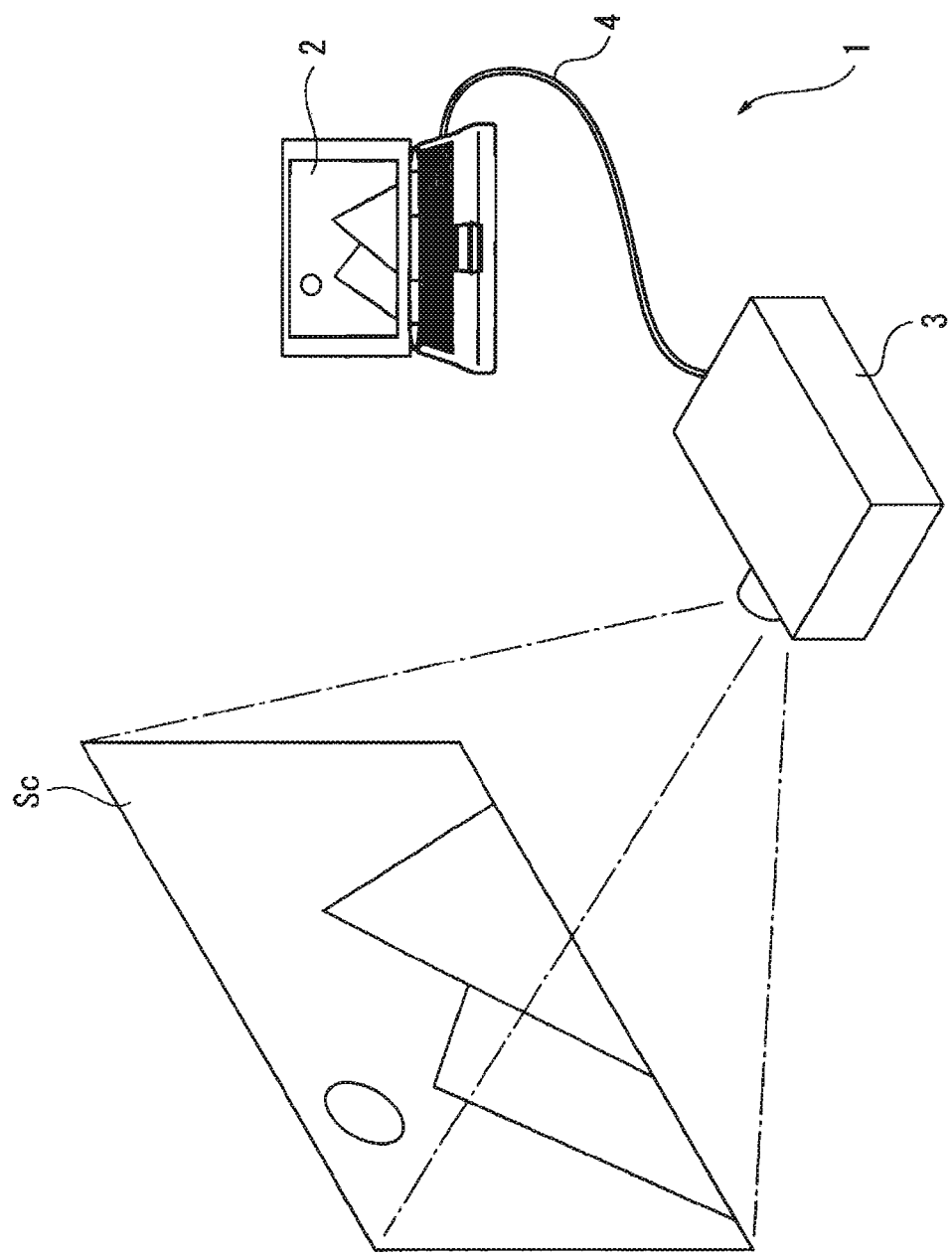
FIG. 1 is an outline view of a projection system according to the present embodiment.

FIG. 1 is an outline view of a projection system 1.

As shown in FIG. 1, the projection system 1 is provided with a PC2 as an information processing device for performing predetermined image processing on an image from an image source and then outputting the image data, a projector 3 for generating a present image frame based on the image signal from the PC 2 and projecting it towards a screen Sc, and an USB cable 4 as an information transfer means for connecting between the PC 2 and the projector 3 so as to communicate data therebetween.

2. Configuration of PC

Figure 2:
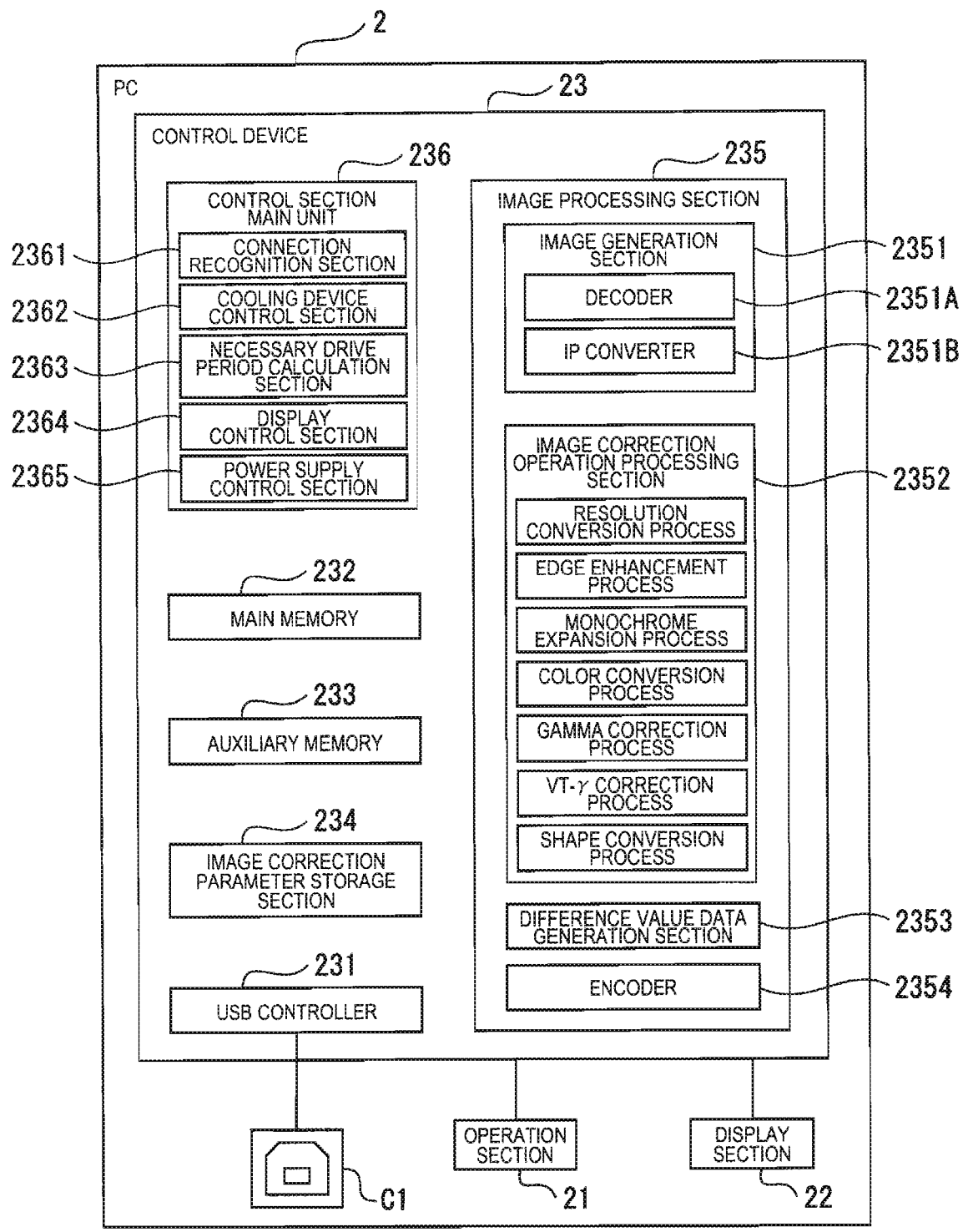
FIG. 2 is a block diagram showing a schematic configuration of a PC according to the embodiment.

FIG. 2 is a block diagram showing a schematic configuration of the PC 2.

As shown in FIG. 2, the PC 2 is mainly composed of a operation section 21 as a setting input section, a display section 22, and a control section 23.

The operation section 21 is provided with, for example, a various operation buttons subject to input operations with a keyboard and a mouse. By performing the input operation of the operation button, the control device 23 can properly be operated, and setting of action contents of the control device 23 is also performed with respect to the information to be displayed on the display section 22. Then, in accordance to the input operation of the operation section 21 by the user, a predetermined suitable operation signal is output to the control device 23 from the operation section 21.

It should be noted that the operation section 21 can take a configuration for setting various conditions not only by the input operation with the operation button but also by an input operation with a touch panel or an input operation with voice, for example.

The display section 22 is controlled by the control device 23 to display predetermined information. For example, the information processed by the control device 23 is displayed, or when the information stored in a memory of the control device 23 described later is input for setting or updated in accordance with the input operation of the operation section 21, the data in the memory output from the control device 23 is also displayed as desired. As the display section 22, for example, liquid, crystal, organic electroluminescence (EL), a plasma display panel (PDP), a cathode-ray tube (CRT), and so on can be used.

The control device 23 executes a predetermined program in accordance with input of the operation signal from the operation section 21 to control the overall PC 2. As shown in FIG. 2, the control device 23 is provided with a USB controller 231, a main memory 232, an auxiliary memory 233, an image correction parameter storage section 234, an image processing section 235, a control section main unit 236, and so on. Each of these components 231 through 236 are connected to each other by a bus not shown in the drawings to be configured so as to be able to communicate necessary information.

The USB controller 231 is electrically connected to the projector 3 via the USB cable 4, and is a section for performing input and output of data in the USB standard with the projector 3.

It should be noted here that the USB (USB cable 4) is composed of four lines, namely signal lines D+/D−, a power supply line Vcc (+5 volts) as a power transmission line, and GND, although the specific illustration is omitted. Thus, the USB (USB cable 4) allows data input and output with the projector 3, and also allows power supply to the projector 3 from a power supply section (processing device side power supply section) in the PC 2, not shown in the drawings, via the power supply line.

The main memory 232 stores various data. As the various data, for example, the operation signal output from the operation section 21, data input via the USB controller 231, data to be processed by the image processing section 235 and the control section main unit 236 and so on can be cited.

As the auxiliary memory 233, a medium of the image source is utilized. For example, the digital versatile disc (DVD) storing images and sounds as digital data can be exemplified.

The image correction parameter storage section 234 stores a correction parameter for image correction corresponding to the characteristics of the projector 3.

It should be noted here that as the image correction process there are cited a correction process completed in every pixel such as a process for converting color, brightness, resolution of every pixel so as to match the display characteristics of the projector 3 and a correction process performed across a plurality of adjacent pixels such as a ghost correction or a crosstalk correction for correcting color variations caused in consequence of other pixels.

The image processing performed in the PC 2 is mainly the process completed in every pixel in an image, and mainly the correction process for converting color, brightness, and resolution of the pixel.

As the correction parameter stored in the image correction parameter storage section 234, for example, various correction parameters for resolution conversion, edge enhancement, monochrome expansion, color conversion, a gamma correction, a VT-γ correction, and so on can be exemplified.

In these correction processes, the only thing, which occurs therein, is that data of each of the pixels is processed with a predetermined conversion process, and in comparison between the case in which the difference data between the image frames is obtained in the state of the original image prior to being processed with the correction process and the case in which the difference data is obtained between the image frames processed with the correction process, the sizes of these difference data are not so different.

It should be noted that in the present embodiment the difference data is not set so large, and accordingly, the shape correction is included in the correction processes executed by the PC 2, the correction parameter of the shape correction is also stored in the image correction parameter storage section 234.

It should also be noted that a memory card or a CD-ROM storing such correction parameters can be implemented in the PC 2 to installed the correction parameters in the image correction parameter storage section 234.

Alternatively, it is possible that the PC 2 reads predetermined correction parameters from the projector 3 to store them in the image correction parameter storage section 234 when the PC 2 and the projector 3 are connected to each other.

The image processing section 235 is configured including, for example, a graphical processor unit (GPU), and for performing the correction processes described above. The image processing section 235 is provided with, as shown in FIG. 2, an image generation section 2351, an image correction operation processing section 2352, a difference data generation section 2353, and an encoder 2354.

As shown in FIG. 2, the image generation section 2351 is provided with a decoder 2351A and an IP conversion section 2351B, and performs decompression on the image source from the auxiliary memory 233 in accordance with the recording method to decode the image data (image information) for every frame. Further, the image generation section 2351 outputs the image data thus decoded to the image correction operation processing section 2352.

The image correction operation processing section 2352 corrects the image data decoded by the image generation section 2351 in accordance with the characteristics of the projector 3. Further, the image correction operation processing section 2352 outputs the image data thus corrected to the difference data generation section 2353. As the correction process, a resolution conversion process, an edge enhancement process, a monochrome expansion process, a color conversion process, a gamma correction process, a VT-γ correction process, and a shape correction process can be exemplified.

The difference data generation section 2353 compares the latest image data with the previous image data with respect to the image data corrected by the image correction operation processing section 2352 and detects the portion of the latest data changed from the previous data as the difference data. In other words, the difference data includes an amount of spatial change and an amount of tonal change included in the latest image data compared to the previous image data. Further, the difference data generation section 2353 outputs the difference data to the encoder 2354.

The encoder 2354 encodes the difference data generated by the difference data generation section 2353. Further, the difference data thus encoded by the encoder 2354 is transmitted to the USB controller 231 and, via the USB cable 4, to the projector 3.

The control section main unit 236 is configured including, for example, a central processing unit (CPU) for controlling the whole of the PC 2 in accordance with a predetermined program stored in the main memory 232 or the like. The control section main unit 236 is provided with, as shown in FIG. 2, a connection recognition section 2361, a cooling device control section 2362, a necessary drive period calculation section 2363, a display control section 2364, a power supply control section 2365, and so on.

The connection recognition section 2361 recognizes whether or not the USB cable 4 is connected to both of a USB connector C1 (see FIG. 2) of the PC 2 and a USB connector C2 (see FIG. 4) of the projector 3 and accordingly the PC 2 and the projector 3 are connected to each other via the USB cable 4. For example, the connection recognition section 2361 recognizes that the connection state is established by obtaining notice information showing the connection state transmitted from the projector 3 side via the USB cable 4 and the USB controller 231 when the PC 2 and the projector 3 are connected with the USB cable 4. In other words, the connection recognition section 2361 recognizes the unconnected state in the condition in which it has not received the notice information.

The cooling device control section 2362 transmits a predetermined control instruction to the projector 3 side via the USB controller 231 and the USB cable 4, thereby performing drive control of the cooling device described later forming the projector 3. More specifically, the cooling device control section 2362 obtains temperature information regarding the temperature in the vicinity of the light source device described later transmitted by the projector 3 side via the USB cable 4 and the USB controller 231, and generates and then transmits the control instruction to perform the drive control of the cooling device. As the drive control of the cooling device in the cooling device control section 2362, for example, the following method can be exemplified.

For example, the cooling device control section 2362 recognizes the temperature of the light source device in series based on the temperature information transmitted from the projector 3 side, calculates the difference value between the detected temperature thus recognized and predetermined target temperature stored in the main memory 232, and makes a voltage value applied to the cooling device be changed in accordance with the difference value, thereby performing feedback control so that the temperature of the light source device becomes the target temperature. It should be noted that any feedback control for changing the voltage value applied to the cooling device based on the difference value between the detected temperature and the target temperature can be used as the present feedback control, and either one of proportional control, proportional integral (PI) control, proportional integral differential (PID) control, and so on can be adopted.

Further, voltage temperature association information including the temperature information regarding the temperature and voltage value information regarding the voltage value for driving the cooling device in accordance with the temperature associated with each other is previously stored in, for example, the main memory 232. Then, the cooling device control section 2362 sequentially recognizes the temperature in the vicinity of the light source device based on the temperature information transmitted from the projector 3 side, and performs a temperature adaptive control for driving the cooling device with the voltage value corresponding to the detected temperature based on the detected temperature thus recognized and the voltage temperature association information.

It should be noted that a method of performing drive control of the cooling device other than the drive control described above can also be adopted.

Further, the configuration of driving the cooling device with the same drive control method in both of the lighting period and the lighting-out period of the light source device can be adopted, or the configuration thereof with different drive control methods in the respective periods can also be adopted. For example, after lighting-out of the light source device, it is possible to perform control of driving the cooling device with an invariably constant voltage value in accordance with the temperature in the vicinity of the light source device immediately after the lighting-out thereof.

The necessary drive period calculation section 2363 calculates a necessary drive period in which the cooling device is continued to be driven for cooling the light source device after lighting-out the light source device. As the calculating method of the necessary drive period in the necessary drive period calculation section 2363, for example, the following method can be exemplified.

Temperature time association information including the temperature information regarding the temperature and time information regarding the period of time necessary for lowering the temperature in the vicinity of the light source device with the drive control by the cooling device control section 2362 associated with each other is previously stored in, for example, the main memory 232. Then, the necessary drive period calculation section 2363 recognizes the temperature in the vicinity of the light source device based on the temperature information immediately after lighting-out the light source device transmitted from the projector 3 side, and calculates the necessary drive period based on the time information corresponding to the detected temperature in accordance with the detected temperature thus recognized and the temperature time association information.

Further, as described later in detail, the present embodiment has the configuration in which the projector 3 side independently drives the cooling device in the case in which the USB cable 4 is pulled out from the USB connectors C1, C2 immediately after lighting-out the light source device, namely in the case in which the cooling device control section 2362 cannot perform the drive control of the cooling device. For the present function, necessary period information regarding the period of time for the projector 3 side to independently drive the cooling device after lighting-out the light source device is previously stored in, for example, the main memory 232. Further, the necessary drive period calculation section 2363 calculates a lighting-out-unconnected-state time period, which is a time period from lighting-out the light source device to the recognition of the unconnected state by the connection recognition section 2361. Then, the necessary drive period calculation section 2363 calculates the necessary drive time by subtracting the lighting-out-unconnected-state time period from the time period based on the necessary time information. It should be noted that the time period based on the necessary period information can be calculated as the necessary drive time.

The display control section 2364 controls driving of the display section 22 to make the display section 22 display a predetermined information. As the information displayed on the display section 22 by the drive control of the display section 22 by the display control section 2364, the following information can be cited, for example.

Figure 3:
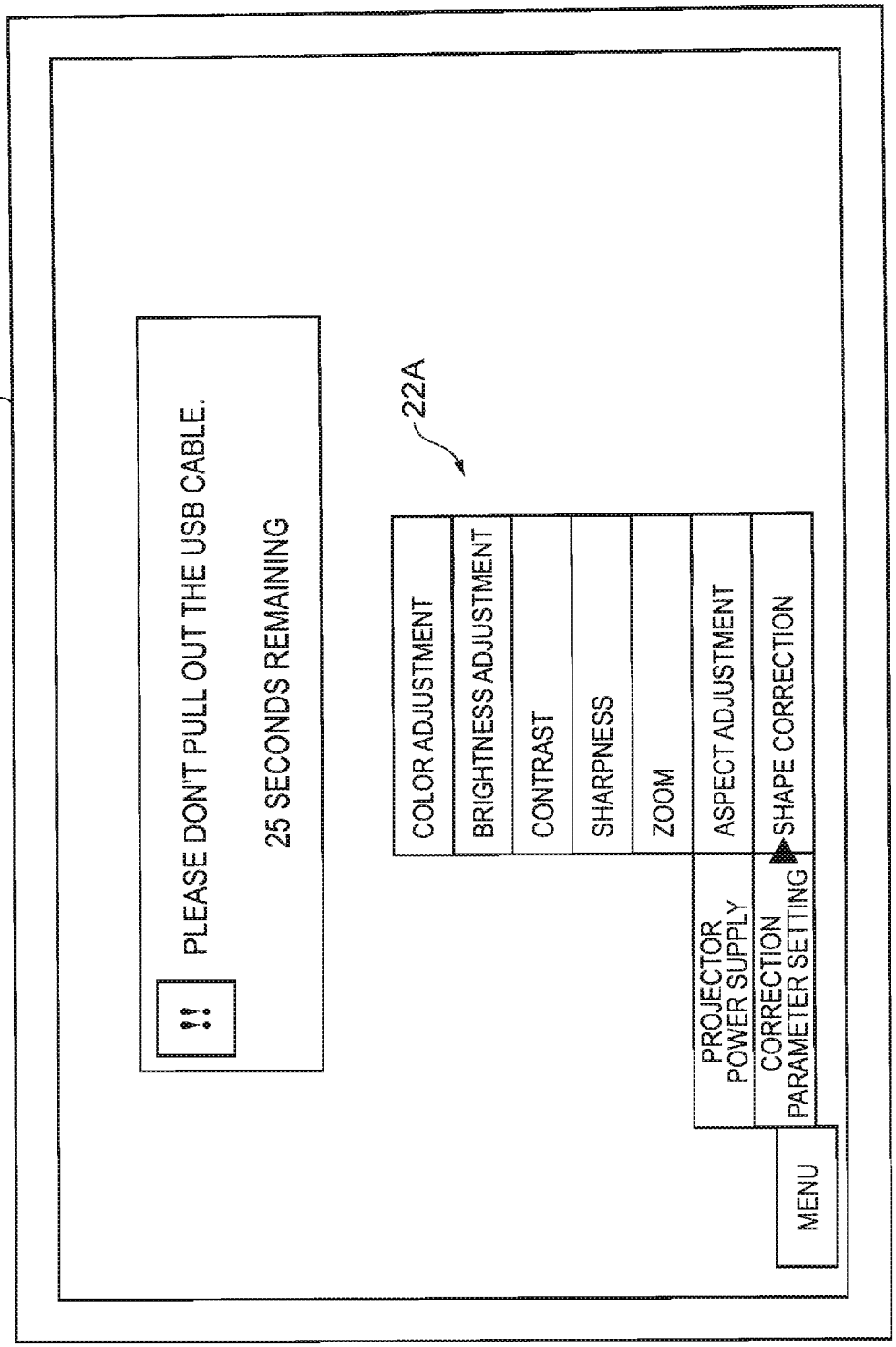
FIG. 3 is a diagram showing an example of information displayed on the display section according to the embodiment.

FIG. 3 is a diagram showing an example of the information displayed on the display section 22.

Menu information regarding a menu display field for performing power ON/OFF control of the projector 3 and correction parameter setting is previously stored in, for example, the main memory 232. It should be noted that as the menu information for performing the correction parameter setting, for example, a color adjustment and a brightness adjustment can be cited. Further, as the correction parameter, for example, correction parameters for resolution conversion, edge enhancement, monochrome expansion, color conversion, a gamma correction, a VT-γ correction, shape conversion, a ghost correction, a cross-talk correction, a color shading correction, and so on can be exemplified.

Then, based on a predetermined operation signal output from the operation section 21, the display control section 2364 makes the display section 22 display a menu display field 22A in accordance with the menu information as shown in FIG. 3. Thus, when the user operates the menu display field 29A through the operation section 21, the power ON/OFF control of the projector 3, correction parameter setting, and so on are performed.

Further, for example, the display control section 2364 makes the display section 22 display information regarding the necessary drive period when the necessary drive period has calculated by the necessary drive period calculation section 2363.

It should be noted here that the display control section 2364, in response to the connection recognition section 2361 recognizing the connected state, makes the display section 22 display information (see FIG. 3, for example) instructing not to pull out the USB cable 4 from the connectors C1, C2 until the necessary drive period has elapsed as the information regarding the necessary drive period.

Further, the display control section 2364, in response to the connection recognition section 2361 recognizing the unconnected state, makes the display section 22 display information instructing not to unplug the AC cable from the projector 3 or the outlet until the necessary drive period has elapsed as the information regarding the necessary drive period.

In this case, the display section 22 corresponds to an annunciation section according to an embodiment of the invention while the display control section 2364 corresponds to an annunciation control section according to an embodiment of the invention.

The power supply control section 2365 controls powering ON/OFF of the projector 3.

For example, the power supply control section 2365 inputs the operation signal as state switching information output from the operation section 21 in response to the operation section 21 operating the menu display field 22A to input for setting the state switching information instructing to activate the projector 3 or to stop driving the projector 3. Then, the power supply control section 2365, based on the state switching information, transmits the control instruction of activating the projector 3 or the control instruction of stopping driving the projector 3 to the projector 3 side via the USB controller 231 and the USB cable 4, thereby controlling switching ON/OFF of the projector 3. As the control instruction of stopping driving the projector 3, a first control instruction of lighting-out the light source device and a second control instruction of stopping driving the projector 3 by switching OFF the power of the projector 3 after the necessary drive period obtained by the necessary drive period calculation section 2363 has elapsed after the light source device has been lighted-out are cited.

3. Configuration of Projector

Figure 4:
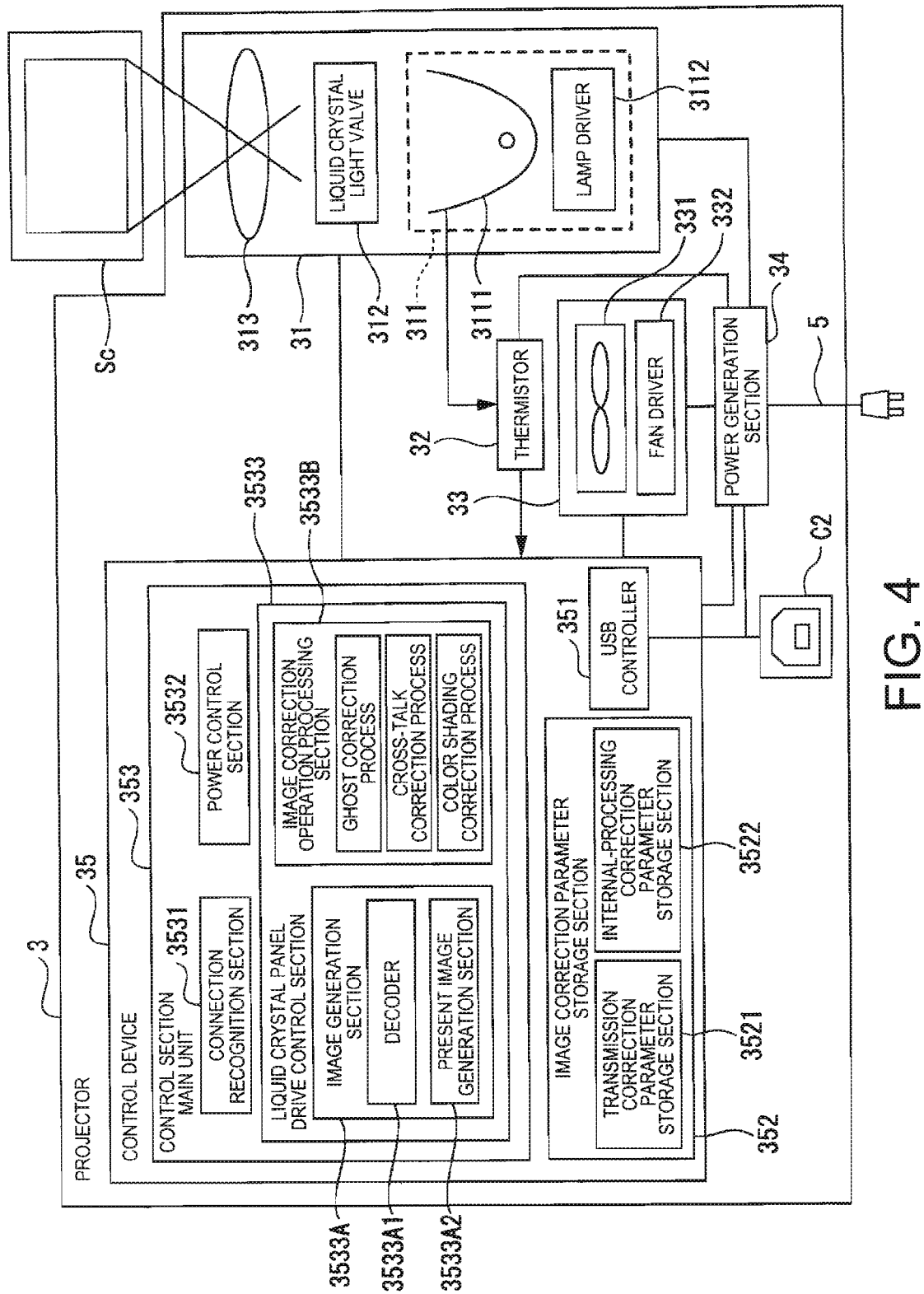
FIG. 4 is a block diagram showing a schematic configuration of a projector according to the embodiment.

FIG. 4 is a block diagram showing a schematic configuration of the projector 3.

As shown in FIG. 4, the projector 3 is mainly composed of an image projection section 31, a thermistor 32 as a temperature detection section, a cooling device 33, a power generation section 34, and a control device 35.

The image projection section 31 forms an optical image and enlargedly projects it on the screen Sc under control by the control device 35. As shown in FIG. 4, this image projection section 31 is provided with a light source device 311, a liquid crystal light valve 312 as a light modulation element, and a projection optical device 313.

The light source device 311 emits a light beam towards the liquid crystal light valve 312 under control by the control device 35. This light source device 311 is provided with a light source lamp 3111 and a lamp driver 3112.

The light source lamp 3111 is composed of a super high pressure mercury lamp. It should be noted that instead of the super high pressure mercury lamp, other discharge emission type of light source lamps such as a metal halide lamp or a xenon lamp can also be adopted. Further, instead of the discharge emission type of light source lamps, various self-emission elements such as a light emitting diode, a laser diode, an organic EL element, or a silicon light emitting element can also be adopted.

The lamp driver 3112 drives the light source amp 3111 with a predetermined drive voltage under control by the control device 35.

The liquid crystal light valve 312 is a transmissive liquid crystal panel, and varies the arrangement of the liquid crystal molecules encapsulated in liquid crystal cells (omitted from the drawings) based on the drive signal from the control device 35 to transmit or block the light beam emitted from the light source lamp 3111, thereby emitting an optical image in accordance with the image data processed by the PC 2 towards the projection optical device 313.

The projection optical device 313 enlargedly projects the optical image emitted from the liquid crystal light valve 312 towards the screen Sc.

It should be noted that, although omitted from the drawings, the projector 3 is provided with three liquid crystal light valves 312 corresponding to three colors of R, G, and B, respectively. Further, the light source device 311 is provided with a color separator optical system for separating the light source light into three colored light beams. Further, the projection optical device 313 includes a combining optical system for generating an optical image representing a color image by combining the three colored image light beams. It should be noted that as the configuration of such an optical system, various typical configurations of the optical systems of the projector can be used.

The thermistor 32 is disposed in the vicinity of the light source lamp 3111, the target of cooling, to detect the temperature in the vicinity of the light source lamp 3111. Then, the thermistor 32 outputs a predetermined signal as the temperature information corresponding to the detected temperature to the control device 35.

The cooling device 33 sends cooling air to the light source lamp 3111 or sucks in the air in the vicinity of the light source lamp 3111 to cool the light source lamp 3111. As shown in FIG. 4, the cooling device 33 is provided with a cooling fan 331 for sending cooling air to the light source lamp 3111 or sucking in the air in the vicinity of the light source lamp 3111 and a fan driver 332 for driving the cooling fan 331 with a predetermined drive voltage in accordance with the control instruction transmitted from the PC 2 side via the USB cable 4.

The power generation section 34 is a section for supplying each component in the projector 3 with the power supplied from the outside via the AC cable 5 (see FIG. 4) connected to the external power supply and the power supplied from the PC 2 side via the USB cable 4. In other words, the power generation section 34 is configured including a power conversion circuit for performing AC/DC conversion on the alternate current power supplied from the outside via the AC cable 5 to obtain the drive voltage stabled in a predetermined level, a power conversion circuit for performing DC/DC conversion on the VCC voltage supplied from the PC 2 side via the USB cable 4 to generate the drive voltage, and so on.

The power generation section 34 acts as described below.

In the normal drive condition, for example, namely in the case in which the power is supplied to the power generation section 34 from the outside via the AC cable 5, and the power is also supplied to the power generation section 34 from the PC 2 side via the USB cable 4, the action will be as follows.

That is, the power generation section 34 performs the AC/DC conversion on the alternate current power supplied from the outside via the AC cable 5 to generate the drive voltage stabled in the predetermined level, and respectively supplies the light source device 311, the thermistor 32, and the control device 35 with the drive voltage.

Further, the power generation section 34 performs the DC/DC conversion on the VCC voltage supplied from the PC 2 side via the USB cable 4 to generate the drive voltage, and supplies the cooling device 33 with the drive voltage.

Further, for example, in the case in which the AC cable 5 is unplugged from the projector 3 or the outlet (omitted from the drawings) in the normal drive condition described above, namely in the case in which the power supply from the outside via the AC cable 5 is blocked, the action will be as follows.

That is, the power generation section 34 recognizes that the power supply from the outside via the AC cable 5 is blocked, and switches the drive voltage to be supplied to the thermistor 32 and the control device 35 to the drive voltage generated from the power supplied from the PC 2 side via the USB cable 4 in accordance with the program stored in an internal memory or the like not shown in the drawings. Therefore, the power generation section 34 performs the DC/DC conversion on the VCC voltage supplied from the PC 2 side via the USB cable 4 to generate the drive voltage, and supplies the thermistor 32, the control device 35, and the cooling device 33 with the drive voltage.

Further, for example, in the case in which the USB cable 4 is pulled out from the connectors C1, C2 in the normal drive condition described above, namely in the case in which the power supply from the PC 2 side via the USB cable 4 is blocked, the action will be as follows.

That is, the power generation section 34 switches the drive voltage to be supplied to the cooling device 33 to the drive voltage generated from the power supplied via the AC cable 5 in accordance with the power switching signal output from the control device 35. Further, the power generation section 34 stops supplying the drive voltage to the light source device 311. Therefore, the power generation section 34 performs the AC/DC conversion on the alternate current power supplied from the outside via the AC cable 5 to generate the drive voltage stabled in the predetermined level, and supplies the thermistor 32, and the control device 35, and the cooling device 33 with the drive voltage.

Further, for example, in the normal drive condition as described above, the power generation section 34, more specifically, changes the state of supplying the drive voltage in accordance with the control instruction sent from the PC 2 side via the USB cable 4 for activating the projector 3 or the control instruction for stopping driving the projector 3 under control by the control device 35. Specifically, the power generation section 34 becomes the ON state to supply each of the components with the drive voltage in accordance with the control instruction for activating the projector 3. Further, in accordance with the control instruction (the first control instruction and the second instruction described above) for stopping driving the projector 3, the power generation section 34 stops supplying the light source device 311 with the drive voltage and becomes the OFF state to stop supplying other components with the drive voltage after a predetermined period of time (the necessary drive period) has elapsed.

The control device 35 controls the overall projector 3 in accordance with the control instruction from the PC 2 side. As shown in FIG. 4, the control device 35 is provided with a USB controller 351, an image correction parameter storage section 352, a control section main unit 353, and so on. Each of these components 351 through 353 are connected to each other by a bus not shown in the drawings to be configured so as to be able to communicate necessary information.

The USB controller 351 is similar to the USB controller 231 of the PC 2, and is electrically connected to the PC 2 via the USB cable 4, and is a section for performing input and output of data in the USB standard with the PC 2.

The image correction parameter storage section 352 is provided with a transmission correction parameter storage section 3521 and a internal-processing correction parameter storage section 3522.

The transmission correction parameter storage section 3521 stores the correction parameters for performing image correction in the PC 2.

As the correction parameters stored in the transmission correction parameter storage section 3521, the correction parameters for resolution conversion, edge enhancement, monochrome expansion, color conversion, gamma correction, VT-γ correction, and shape conversion can be cited.

When the PC 2 and the projector 3 are connected to each other via the USB cable 4, the PC 2 retrieves the information of the correction parameters stored in the transmission correction parameter storage section 3521 to store it in the image correction parameter storage section 234.

The internal-processing correction parameter storage section 3522 stores the correction parameters for performing image processing in the projector 3.

As the correction parameters stored in the internal-processing correction parameter storage section 3522, the correction parameters for ghost correction; cross-talk correction, and color shading correction can be cited.

It should be noted here that the color shading caused in consequence of other pixels according to the configuration of the projector 3 is called the cross-talk or the ghost, and the cross-talk denotes a variation in an image caused when the pixel is driven by the leakage current of the signal applied to the adjacent pixel while the ghost denotes that an image appears as if it shifts and overlaps therewith.

It should be noted here that the ghost correction and the cross-talk correction are performed in the projector 3 side because the difference value data becomes large and accordingly the data transfer difficult to be executed in time considering the transfer rate of the USB cable 4 if the ghost correction and the cross-talk correction are performed in the PC 2 side.

Further, the color shading correction is executed in the projector 3 side because it is desirable to perform the color shading correction the last, and accordingly, the color shading correction is consequently performed after the ghost correction and the cross-talk correction are performed in the projector 3.

The control section main unit 353 is configured including, for example, a CPU, and is a section or controlling the overall projector 3 in accordance with the control instructions from the PC 2 side and the program stored in the memory not shown in the drawings. This control section main unit 353 is, as shown in FIG. 4, provided with a connection recognition section 3531, a power control section 3532, a liquid crystal panel drive control section 3533, and so on.

The liquid crystal panel drive control section 3533 is, as shown in FIG. 4, provided with an image generation section 3533A and an image correction operation processing section 3533B.

The image generation section 3533A is, as shown in FIG. 4, provided with a decoder 3533A1 and a present image generation section 3533A2.

The decoder 3533A1 decodes the image data transmitted from the PC 2. In other words, the image data from the PC 2, which is encoded by the encoder 2354, is decoded by the decoder 3533A1, thereby obtaining the difference value data.

The present image generation section 3533A2 combines the difference value data thus decoded with respect to the presently projected image data to newly generate the present image data.

The image correction operation processing section 3533B performs various correction processes such as the ghost correction process, the cross-talk correction process, or the color shading correction process on the present image data generated by the present image generation section 3533A2. Then, the drive signal based on the present image data processed with the various correction processes by the image correction operation processing section 3533B is output to the liquid crystal light valve 312, and the liquid crystal light valve 312 forms the optical image corresponding to the present image data.

The connection recognition section 3531 recognizes whether or not the USB cable 4 is connected to both of the USB connector C2 (see FIG. 4) of the projector 3 and the USB connector C1 of the PC 2 and accordingly the projector 3 and the PC 2 are connected to each other via the USB cable 4. For example, the connection recognition section 3531 recognizes whether it is the connected state or the unconnected state by detecting (watching the VCC voltage) presence or absence of the power supply transmitted from the PC 2 side via the USB cable 4. That is, the connection recognition section 3531 recognizes the connected state when the presence of the power supply from the PC 2 side is detected. Then, the connection recognition section 3531 transmits notice information of the connected state to the PC 2 side via the USB controller 351 and the USB cable 4. Further, the connection recognition section 3531 recognizes the unconnected state when the absence of the power supply from the PC 2 side is detected.

The power control section 3532 performs drive control of the power generation section 34 in accordance with the control instructions from the PC 2 side and the program stored in the memory not shown in the drawings.

For example, in accordance with the control instruction transmitted from the PC 2 side for activating the projector 3, the power control section 3532 sets the power generating section 34 to the ON state and makes the power generation section 34 supply each of the components of the projector 3 with the drove voltage.

Further, for example, in accordance with the control instruction (the first control instruction described above) transmitted from the PC 2 side for stopping driving the projector 3, the power control section 3532 makes the power generation section 34 stop supplying the light source device 311 with the drive voltage.

Further, for example, in accordance with the control instruction (the second control instruction) transmitted from the PC 2 side for stopping driving the projector 3, the power control section 3532 switches the power generation section 34 to the OFF state and makes the power generation section 34 stop supplying each of the components other than the light source device 311 with the drive voltage.

Further, for example, in the case in which the connection recognition section 3531 recognizes the unconnected state, namely in the case in which the USB cable 4 has been pulled out from the USB connectors C1, C2, the power control section 3532 outputs the power switching signal to the power generation section 34 to make it switch the drive voltage to be supplied to the cooling device 33 to the drive voltage generated from the power supplied via the AC cable 5. Further, in that case, the power control section 3532 makes the power generation section 34 stop supplying the light source device 311 with the drive voltage.

4. Action of Projection System

The action of the projection system 1 described above will now be explained with reference to the accompanying drawings.

It should be noted that, in the following descriptions, the actions of the projection system 1 will be described in the following order, firstly the action in the case in which the AC cable is unplugged from the projector 3 or the outlet in the normal drive condition, then the action in the case in which the power of the projector 3 is switched to the OFF state by operating the operation section 21 of the PC 2 in the normal condition, and then the action in the case in which the USB cable 4 is pulled out from the USB connectors C1, C2 in the normal drive condition.

4-1. Action with AC Cable Unplugged

Figure 5:
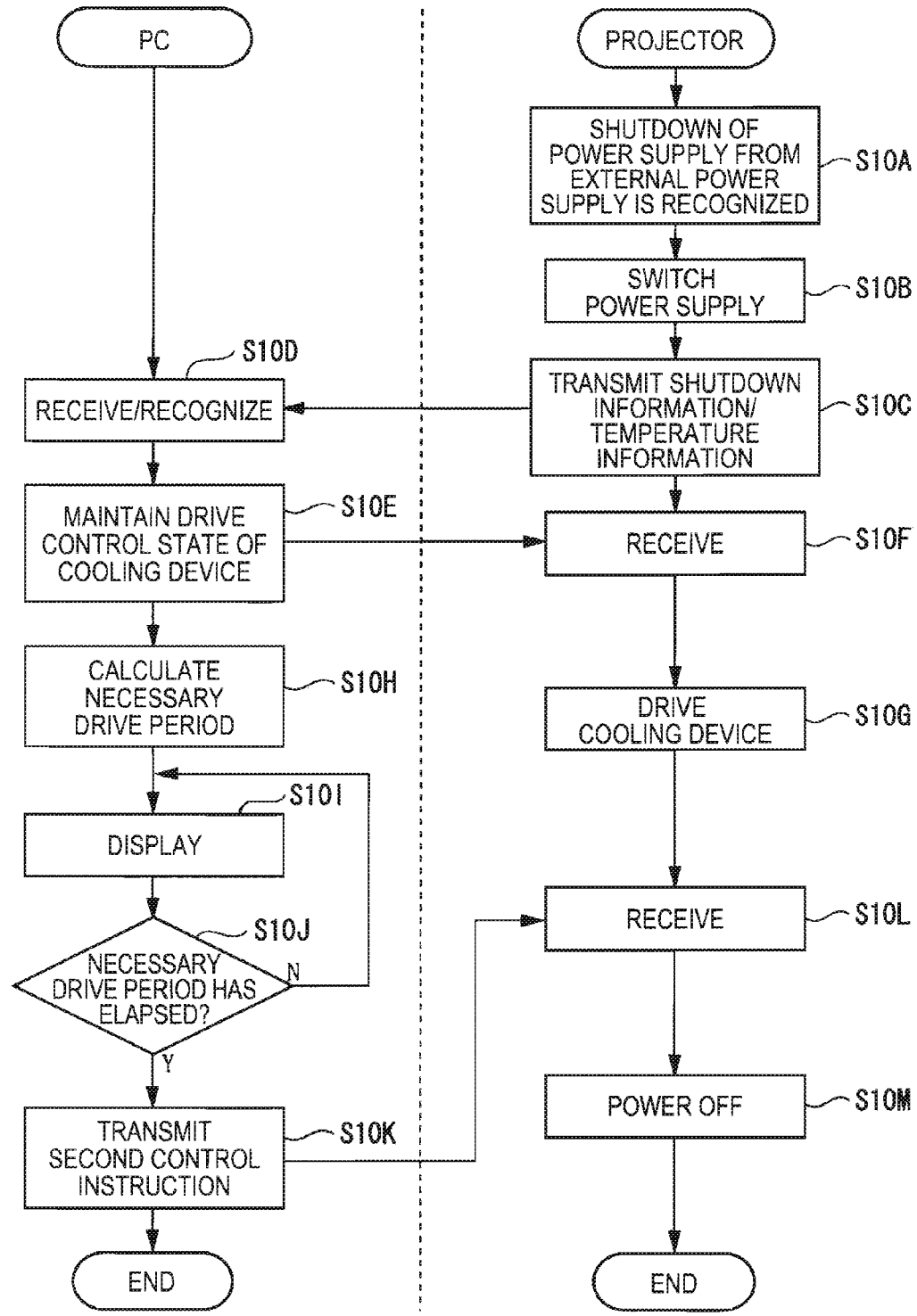
FIG. 5 is a flowchart for explaining the operation of the projection system according to the embodiment.

FIG. 5 is a flowchart for explaining the action of the projection system 1. Specifically, FIG. 5 is a flowchart for explaining the action of the projection system 1 in the case in which the AC cable 5 is unplugged from the projector 3 or the outlet in the normal drive condition.

In the case in which the AC cable 5 is unplugged from the projector 3 or the outlet without discretion in the normal drive condition in which the power is supplied to the power generation section 34 from the outside via the AC cable 5 and also the power is supplied to the power generation section 34 from the PC 2 side via the USB cable 4, the power supplied from the outside through the AC cable 5 is blocked, and the drive voltage supplied from the power generation section 34 to the light source device 311, the thermistor 32, and the control device 35 is stopped. That is, the light source lamp 3111 is to be lighted-out. In this condition, the power generation section 34 supplies only the cooling device 33 with the drive voltage based on the power supplied from the PC 2 side via the USB cable 4.

In this case, the power generation section 34 recognizes that the power supply from the outside via the AC cable 5 has been blocked (step S10A).

After the step S10A, the power generation section 34 generates the drive voltage for driving the thermistor 32 and the control device 35 based on the power supplied from the PC 2 side via the USB cable 4 and supplies them with the drive voltage (step S10B). In this condition, the power generation section 34 supplies the cooling device 33, the thermistor 32, and the control device 35 with the drive voltage based on the power supplied from the PC 2 side via the USB cable 4. Further, the power generation section 34 outputs the blocking information representing that the power supplied from the outside via the AC cable 5 has been blocked to the control device 35.

After the step S10B, the control section 35 transmits the blocking information and the temperature information corresponding to the detected temperature in the vicinity of the night source lamp 3111 detected by the thermistor 32 right after lighting-out the light source lamp 3111 to the PC 2 side via the USB cable 4 (step S10C). It should be noted that regarding the transmission of the temperature information, the configuration of transmitting the temperature information only once right after lighting-out the light source lamp 3111 or the configuration of transmitting the temperature information at every predetermined period after lighting-out the light source lamp 3111 can be adopted.

After the step S10C, the control device 23 of the PC 2 receives the blocking information and the temperature information transmitted from the projector 3, and recognizes that the power supply from the outside via the AC cable 5 has been blocked (the light source lamp 3111 has been lighted-out) and the detected temperature in the vicinity of the light source lamp 3111 (step S10D).

After the step S10D, the cooling device control section 2362 generates the control instruction for performing drive control of the cooling device 33 based on the detected temperature in the vicinity of the light source lamp 3111, and transmits the control instruction to the projector 3 side, thereby maintaining the drive control state of the cooling device 33 (step S10E). It should be noted that in the case in which the drive control of the cooling device 33 is performed in the different drive control methods in the lighting condition of the light source lamp 3111 and in the lighting-out condition of the light source lamp 3111 as the drive control method of the cooling device 33 in the cooling device control section 2362, a predetermined control instruction for performing the drive control of the cooling device 33 in the lighting-out condition of the light source lamp 3111 is generated and transmitted to the projector 3 side after recognizing that the light source lamp 3111 has been lighted-out based on the blocking information transmitted from the projector 3.

After the step S10E, the projector 3 receives the control instruction transmitted from the PC 2 (step S10F).

After the step S10F, the cooling device 33 drives the cooling fan 331 in accordance with the control instruction transmitted from the PC 2 with a predetermined drive voltage (a predetermined rotational frequency) (step S10G). Thus, the light source lamp 3111 is cooled by the cooling device 33 even after lighting-out the light source lamp 3111.

Further, after the step S10E, after recognizing that the light source lamp 3111 has been lighted-out and the detected temperature in the vicinity of the light source lamp 3111 right after lighting-out the light source lamp 3111 based on the blocking information transmitted from the projector 3, the necessary drive period calculation section 2363 calculates the necessary drive period based on, for example, the detected temperature and the temperature time association information stored in, the main memory 232 or the like as described above (step S10H).

After the step S10H, the display control section 2364 performs drive control of the display section 22 to display information instructing not to pull out the USB cable 4 from the USB connectors C1, C2 until the necessary drive period obtained by the necessary drive period calculation section 2363 has elapsed on the display section 22 (step S10I).

After the step S10I, the power control section 2365 measures the time elapsed from when the blocking information has been input with a timer not shown in the drawings, and judges whether or not the measured time reaches the necessary drive period obtained by the necessary drive period calculation section 9363 (step S10J).

In the step S10J, if the control device 23 judges "N," namely it judges that the time elapsed from when the light source lamp 3111 has been lighted-out does not reach the necessary drive period, it maintains the display state of the display section 22 in the step S10I.

On the other hand, if the power control section 2365 judges "Y" in the step S10J, namely it judges that the time elapsed from when the light source lamp 3111 has been lighted-out has reached the necessary drive period, it transmits the second control instruction for switching OFF the power of the projector 3 to stop driving the projector 3 to the projector 3 side via the USB cable 4 (step S10K).

After the step S10K, the projector 3 receives the second control instruction transmitted from the PC 2 (step S10L).

After the step S10L, the power control section 3532, in accordance with the second control instruction, switches the power generation section 34 to the OFF state, thus stopping the drive voltage supply from the power generation section 34 to the cooling device 33, the thermistor 32, and the control device 35 (step S10M). Thus, the projector 3 stops driving.

4-2. Action in Response to Power-OFF Operation

Figure 6:
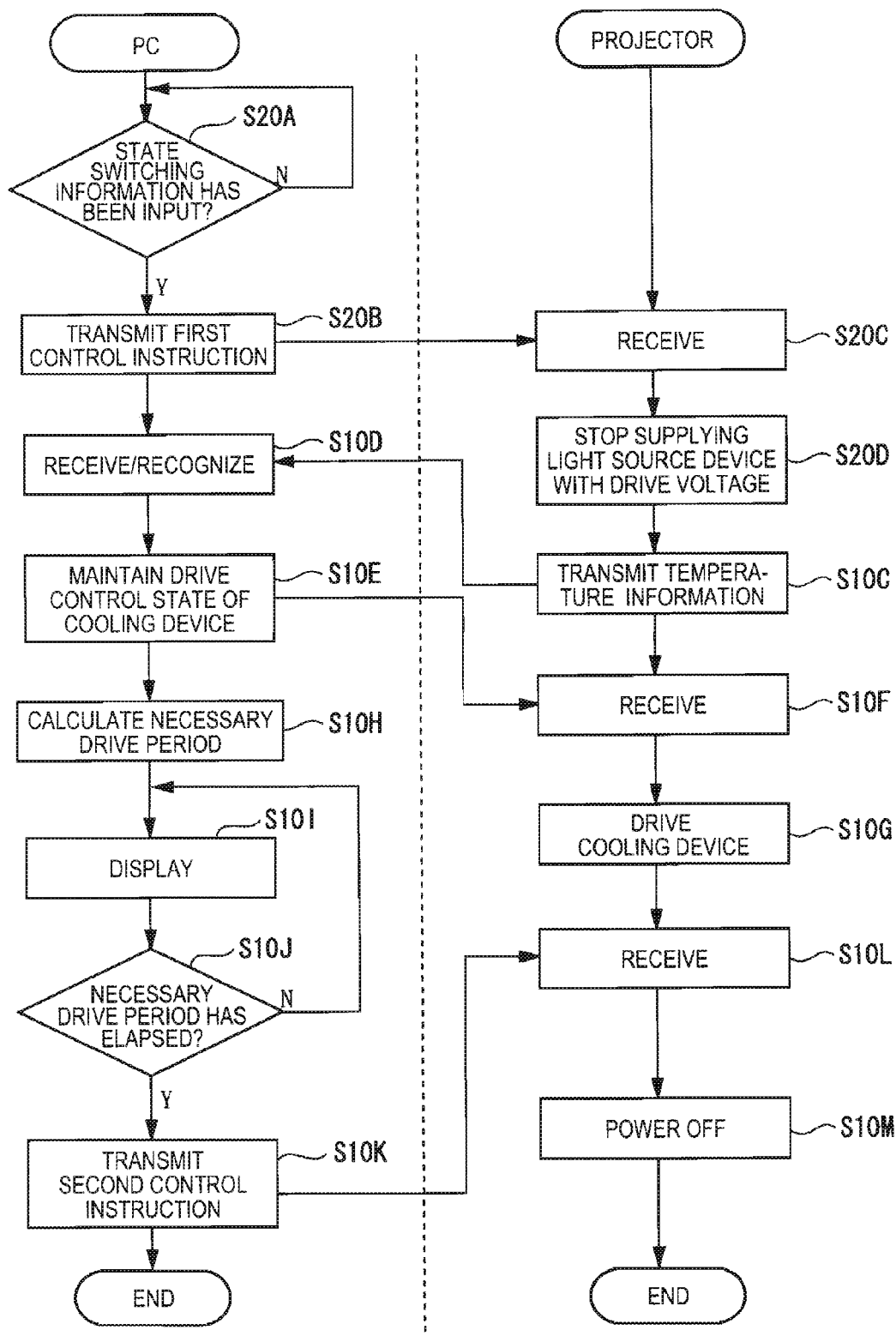
FIG. 6 is a flowchart for explaining the operation of the projection system according to the embodiment.

FIG. 6 is a flowchart for explaining the action of the projection system 1. Specifically, FIG. 6 is a flowchart for explaining the action of the projection system 1 in the case in which the projector 3 is switched to the power-OFF state by an operation of the operation section 21 of the PC 2 in the normal drive condition.

It should be noted that, in the following descriptions, substantially the same actions in the actions in response to the power-OFF operation as the actions in the case in which the AC cable is unplugged described above are denoted with the same references, and the detailed descriptions therefor will be omitted.

Firstly, the power control section 2365 of the PC 2 keeps watching whether or not the menu display field 22A is operated by the operation section 21 to input to set the state switching information requiring to stop driving the projector 3 (step S20A).

In the step S20A, if the power control section 2365 judges "Y," namely it judges that the state switching information requiring to stop driving the projector 3 is input to be set, it transmits the first control instruction for lighting-out the light source lamp 3111 to the projector 3 side via the USB cable 4 (step S20B).

After the step S20B, the projector 3 receives the first control instruction transmitted from the PC 2 (step S20C).

After the step S20C, the power control section 3532 of the projector 3 makes the power generation section 34 stop supplying the light source device 311 with the drive voltage in accordance with the first instruction (step S20D). Thus, the light source lamp 3111 is to be lighted-out.

After the step S20D, the actions will be substantially the same as the steps S10C through S10M in the actions in the case in which the AC cable is unplugged described above.

4-3. Action With USB Cable Pulled Out

Figure 7:
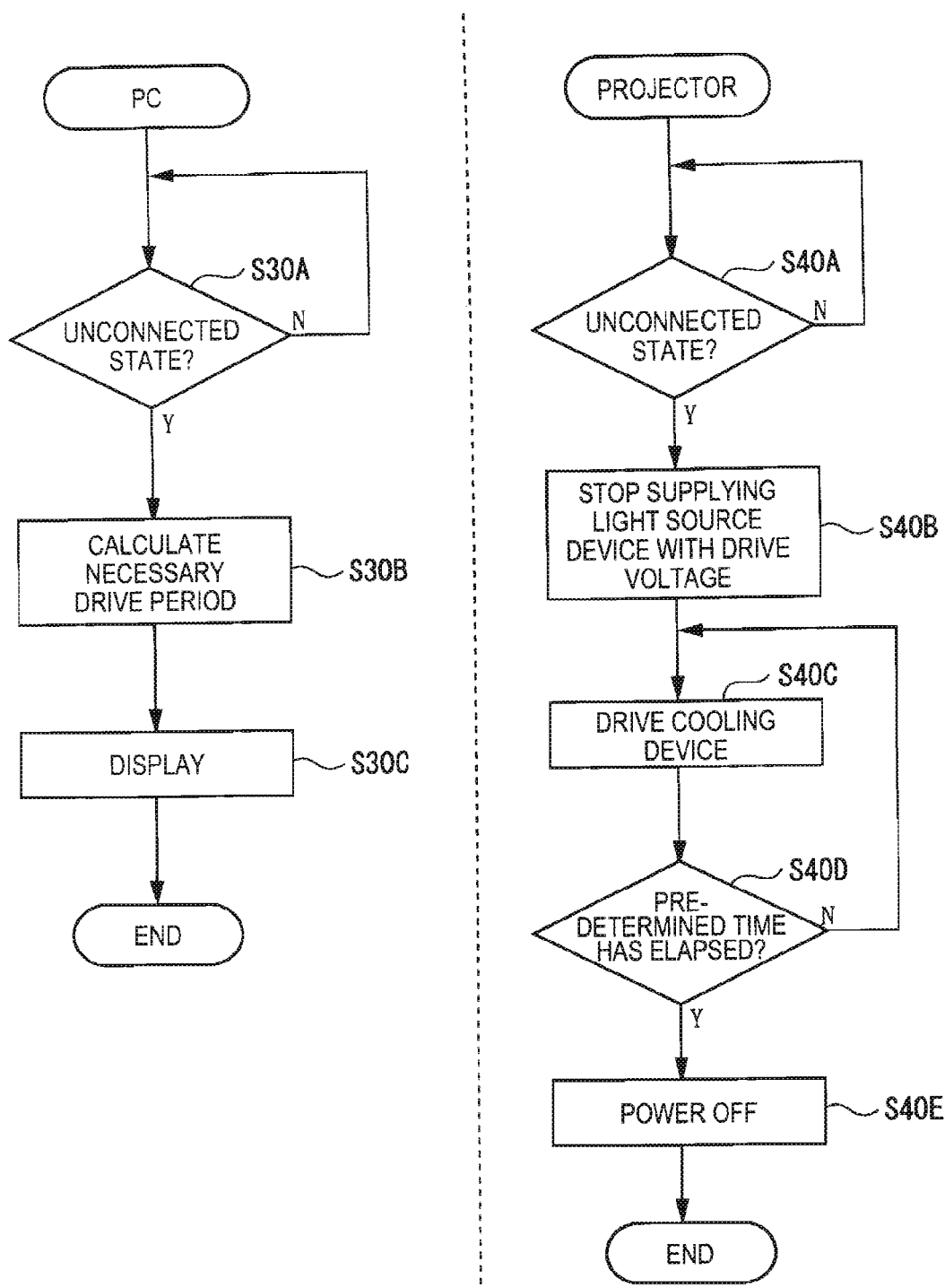
FIG. 7 is a flowchart for explaining the operation of the projection system according to the embodiment.

FIG. 7 is a flowchart for explaining the action of the projection system 1. Specifically, FIG. 7 is a flowchart for explaining the respective actions of the PC 2 and the projector 3 in the case in which the USB cable 4 is pulled out from the USB connectors C1, C2 in the normal drive condition.

It should be noted that in the following descriptions, the actions of the PC 2 and the actions of the projector 3 in the case in which the USB cable 4 is pulled out from the USB connectors C1, C2 without discretion in the normal drive condition are explained in sequence.

4-3-1. Action of PC

Firstly, the connection recognition section 2361 keeps watching whether or not it is unconnected state by keeping watching the notice information representing the connected state transmitted from the projector 3 side via the USB cable 4 (step S30A).

In the step S30A, if it is judged "Y," namely it is judged the unconnected state, the necessary drive period calculation section 2363 obtains the necessary drive period based on, for example, the necessary period information stored in the main memory 232 or the like as described above and the lighting-out-unconnected-state time period obtained as described above (step S30B).

After the step S30B, the display control section 2364 performs drive control of the display section 22 to display information instructing not to unplug the AC cable 5 from the projector 3 or the outlet until the necessary drive period obtained by the necessary drive period calculation section 2363 has elapsed on the display section 22 (step S30C).

4-3-2. Action of Projector

Firstly, the connection recognition section 3531 keeps watching whether or not it is unconnected state by keeping watching presence or absence of the power supply transmitted from the PC 2 side via the USB cable 4 (step S40A).

In the step S40A, if it is judged "Y," namely it is judged the unconnected state, the power control section 3532 outputs the power switching signal to the power generation section 34 to make the power generation section 34 stop the drive voltage supply to the light source device 311 (step S40B). Thus, the light source lamp 3111 is to be lighted-out. Further, the power control section 3532 makes the drive voltage to be supplied to the cooling device 33 be switched to the drive voltage generated from the power supplied via the AC cable 5 (step S40C). Then, the cooling device 33 is driven by the drive voltage supplied from the power generation section 34. In the above condition, the power generation section 34 respectively supplies the cooling device 33, the thermistor 32, and the control device 35 with the drive voltage based on the power supplied from the outside via the AC cable 5.

Further, after the step S40C, the drive period of time of the cooling device 33 from when the light source lamp 3111 has been lighted out is measured by, for example, a timer, and the cooling fan 331 is rotated with a predetermined rotational frequency until the drive period reaches a predetermined elapsed time (step S40D). That is, the projector 3 drives the cooling device 33 by itself after the light source lamp 3111 has been lighted out.

In the step S40D, when the drive period of the cooling device 33 reaches the predetermined elapse of time, the power control section 3532 switches OFF the power generation section 34 to stop the drive voltage supply from the power generation section 34 to the cooling device 33, the thermistor 32, and the control device 35 (step S40E). Thus, the projector 3 stops driving.

According to the embodiment described above, the following advantages are obtained.

In the normal drive condition in which the power generation section 34 is supplied with the power from the external power supply via the AC cable 5 and is also supplied with the power from the PC 2 via a power line of the USB cable 4, the power generation section 34 supplies the cooling device 33 with the drive voltage based on the power supplied from the PC 2 via the USB cable 4 while it supplies other components e.g., the light source device 311, the control device 35, and the thermistor 32) than the cooling device 33 with the drive voltage based on the power from the external power supply. Accordingly, even in the case in which the AC cable 5 is mistakenly unplugged from the projector 3 or the outlet to block the power to be supplied to the projector 3 from the external power supply while the light source lamp 3111 is lighted or immediately after the light source lam 3111 has been lighted out in the normal drive conditions, the cooling device 33 can be driven based on the power supplied form the PC 2 via the USB cable 4, thus cooling after lighting-out the light source lamp 3111 can be executed. Further, according to such a configuration, there is no need for providing the built-in battery in the projector as required in the background art, thus enhancing the cost reduction of the projector 3.

Further, since the PC 2 is provided with the cooling device control section 2362, the drive control of the cooling device 33 can be operated by the PC 2 side by transmitting the control instruction to the projector 3 side via the USB cable 4. Accordingly, the configuration for performing drive control of the cooling device 33 in the projector 3 side can be eliminated, thus simplifying the circuit configuration inside the projector 3, thereby enhancing cost reduction of the projector 3. Further, the drive control of the cooling device 33 can be performed in the PC 2 side even in the case in which the power to be supplied to the projector 3 from the external power supply is blocked, thus cooling of the light source lamp 3111 after lighting-out can efficiently be performed.

In this case, the cooling device control section 2362 performs the drive control of the cooling device 33 based on the temperature information regarding the temperature in the vicinity of the light source lamp 3111 obtained from the projector 3 side via the USB cable 4. Accordingly, the temperature in the vicinity of the light source lamp 3111 can efficiently be reduced to the target temperature. Further, by performing the drive control of the cooling device 33 based on the temperature in the vicinity of the light source lamp 3111, the cooling fan 331 can be driven with the minimum necessary rotational frequency without unnecessarily increasing the rotational frequency of the cooling fan 331, thus the sound caused by driving the cooling fan 331 can be reduced, and accordingly, the silentness of the projector 3 can be assured.

Incidentally, in the case in which the USB cable 4 is pulled out from the PC 2 or the projector 3 without discretion prior to the termination of cooling of the light source lamp 3111 by the cooling device after lighting-out of the light source lamp 3111 after the AC cable 5 has mistakenly been unplugged from the projector 3 or the outlet in the normal drive condition, the power to be supplied to the projector 3 from the PC 2 is stopped, and accordingly, it becomes difficult to drive the cooling device 33 to cool the light source lamp 3111.

According to the present embodiment, since the PC 2 is provided with the necessary drive period calculation section 2363, the necessary drive period calculation section 2363 can calculate the necessary drive period in which the cooling device 33 is driven for cooling the light source lamp 3111 after the light source lamp 3111 has been lighted out based on the temperature information regarding the temperature in the vicinity of the light source lamp 3111 obtained from the projector 3 side via the USB cable 4. Further, since the PC 2 is provided with the display control section 2364 and the display section 22, the display control section 2364 can make the display section 22 display the information regarding the necessary drive period. Accordingly, by making the display section 22 display the information instructing not to pull out the USB cable 4 from the USB connectors C1, C2 until the necessary drive period has elapsed as the information regarding the necessary drive period, it becomes possible to make the user recognize the information. Therefore, it can be prevented that the USB cable 4 is pulled out from the USB connectors C1, C2, prior to the termination of cooling of the light source lamp 3111 by the cooling device 33 after the AC cable 5 has been unplugged from the projector 3 or the outlet, thus the light source lamp 3111 can preferably be cooled by the cooling device 33.

Incidentally, in the background art, the control of powering ON/OFF the projector is generally performed by the user operating the operation panel or the like provided to the projector. Accordingly, when clearing away the projector after use, the user operates the operation panel of the projector to power it OFF, and then pulls out the AC cables, the USB cables, and so on from the projector and the PC. However, in such a configuration, the USB cables might be pulled out from the projector or the PC prior to the completion of cooling of the light source device by the cooling device after powering OFF the projector (lighting-out the light source device). In other words, the preferable cooling of the light source device by driving the cooling device might fail after the power supplied to the projector from the PC has been stopped and the light source device has been lighted out.

According to the present embodiment, since the PC 2 is provided with the operation section 21 and the power control section 2365, the control of powering ON/OFF the projector 3 can be performed in the PC 2 side. Accordingly, after the power control section 2365 performs the powering OFF (lighting-out of the light source lamp 3111) control of the projector 3 in response to the operation of the operation section 21 by the user, the display control section 2364 makes the display section 22 display the information instructing not to pull out the USB cable 4 from the USB connectors C1, C2 until the necessary drive period has elapsed, thereby surely making the user recognize the information. Therefore, it can be prevented that the USB cable 4 is pulled out from the USB connectors C1, C2 prior to the completion of cooling of the light source lamp 3111 by the cooling device 33 after the projector 3 has been powered OFF (the light source lamp 3111 has been lighted-out) by operating the operation section 21 of the PC 2, thus the light source lamp 3111 can preferably be cooled by the cooling device 33.

Incidentally, in the case in which the USB cable 4 is mistakenly pulled out from the USB connectors C1, C2 in the normal drive condition, the power to be supplied from the PC 2 to the projector 3 is stopped, and accordingly it is difficult to cool the light source lamp 3111 by driving the cooling device 33.

According to the present embodiment, since the projector 3 is provided with the connection recognition section 3531 and the power control section 3532, it can detect the connection state between the projector 3 and the PC 2 via the USB cable 4, and if it recognizes unconnected state, it can switch the drive voltage to be supplied to the cooling device 33 to the drive voltage based on the power supplied from the external power supply. Therefore, even in the case in which the USB cable 4 is mistakenly pulled out from the USB connectors C1, C2 in the normal drive condition, the light source lamp 3111 can be cooled by driving the cooling device 33 based on the power supplied from the external power supply.

Incidentally, even in the case in which the cooling device 33 is driven by switching the drive voltage to be supplied to the cooling device 33 to the drive voltage based on the power supplied from the external power supply when the USB cable 4 is mistakenly pulled out from the USB connectors C1, C2 in the normal drive condition, when the AC cable 5 is unplugged from the projector 3 or the outlet, the power supplied to the projector 3 from the external power supply is to be stopped, and accordingly, the light source lamp 3111 cannot be cooled by driving the cooling device 33.

According to the present embodiment, since the PC 2 is provided with the connection recognition section 2361 and the display control section 2364, the connection state between the projector 3 and the PC 2 with the USB cable 4 is detected, and if the unconnected state is recognized, it is possible to make the display section 22 display the information instructing to maintain the power supply state from the external power supply. Therefore, by making the display section 22 display the information instructing not to unplug the AC cable 5 from the projector 3 or the outlet as the information instructing to maintain the power supply state from the external power supply, it becomes possible to make the user recognize the information. Accordingly, it can be prevented that the AC cable 5 is unplugged from the projector 3 or the outlet while the cooling device 33 is driven based on the power supplied from the external power supply because the USB cable 4 is pulled out from the USB connectors C1, C2, thus the light source lamp 3111 can preferably be cooled by the cooling device 33.

Note that the invention is not limited to the embodiments described above but includes modifications and improvements in a range where the advantages of the invention can be achieved.

Although in the embodiment the configuration in which the light source lamp 3111 is adopted as the heat generator and the light source lamp 3111 is cooled is explained, this is not a limitation, and a configuration in which other components in the projector 3 such as the liquid crystal light valve 312 or various circuit elements can be adopted as the heat generator to be cooled can also be adopted.

Although in the embodiment, the configuration provided with the cooling fan 331 for sending cooling air to the heat generator or sucking in the air in the vicinity of the heat generator as the cooling device is explained, this is not a limitation. As the cooling device, any configurations can be adopted providing the heat generator can be cooled. For example, a configuration provided with a pump for circulating a cooling liquid, and the heat generator and the circulating cooling liquid are arranged so as to transfer heat, and the heat generator is cooled by the cooling liquid can be adopted.

Although in the embodiment the USB cable 4 is adopted as information transfer means, this is not a limitation. The information transfer means is not limited to the USB standard providing information can be transferred and electricity can also be supplied, for example, IEEE1394 standard, Power over Ethernet (PoE) standard, and so on can also be adopted.

Although in the embodiment, the projector 3 has the configuration in which an operation section for the power ON/OFF control of the projector 3, or for inputting and setting a variety of information such as the correction parameters is eliminated, this is not a limitation, and a configuration of the projector 3 provided with such an operation section can also be adopted. In this case, it is preferable that the operation section is configured to be concealed with a lid or the like so as not to be used in the normal use, and has a configuration in which the power ON/OFF control of the projector 3 and inputting and setting of various information such as setting of the correction parameters is normally performed in the PC 2 side.

Although in the embodiment, the display section 22 is adopted as the annunciation section, and the display control section 2364 is adopted as the annunciation control section, this is not a limitation. For example, an audio output section such as a loud speaker is adopted as the annunciation section, and an audio control section for performing drive control of the audio output section is adopted as the annunciation control section. Thus, the information regarding the necessary drive period is announced with voice. Alternatively, for example, an LED or the like is adopted as the annunciation section, and an LED control section for performing drive control of the LED is adopted as the annunciation control section. Thus, the information regarding the necessary drive period is announced with lighting of the LED.

In the embodiment, a display appearance with countdown of the necessary drive period, for example, can also be adopted as the information regarding the necessary drive period displayed on the display section 22.

Although in the embodiment, the information regarding the necessary drive period is displayed on the display section 22, this is not a limitation. A configuration for only displaying the information instructing to maintain the power supply condition from the external power supply as the information instructing not to unplug the AC cable 5 from the projector 3 or the outlet, or the information instructing to maintain the connected state between the projector 3 and the PC 2 with information transmission means as the information instructing not to pull out the USB cable 4 from the USB connectors C1, C2 can also be adopted.

Although in the embodiment, the power generation section 34 supplies the drive voltage based on the power supplied from the PC 2 via the USB cable 4 only to the cooling device 33, this is not a limitation. For example, a configuration in which the drive voltage based on the power supplied from the PC 2 via the USB cable 4 is also supplied to, for example, the control device 35 or the thermistor 32 can also be adopted.

Although in the embodiment, as the image processing, a resolution conversion process, an edge enhancement process, a monochrome expansion process, a color conversion process, a gamma correction process, a VT-γ correction process, and a shape correction process are performed in the PC 2 side, and a ghost correction process, a cross-talk correction process, and a color shading correction process are performed in the projector 3 side, this is not a limitation. A configuration in which all of the image processing described above are performed in the PC 2 side can be adopted, or a configuration in which all of the image processing described above are performed in the projector 3 side can also be adopted.

Further, although the transmissive liquid crystal panel (the liquid crystal valve 312) is adopted, this is not a limitation. A reflective liquid crystal panel can also be adopted, or the digital micromirror device (trademark of the Texas Instruments) can also be adopted.

Although in the embodiment, the configuration provided with three liquid crystal light valves 312, this is not a limitation. A configuration provided with only one liquid crystal light valve 312, a configuration provided with two liquid crystal light valves 312, or a configuration provided with four or more liquid crystal light valves 312 can also be adopted.

Further, although the most preferable configuration for putting the invention into practice and so on are disclosed in the above descriptions, the invention is not limited thereto. In other words, although the invention is particularly illustrated and described with respect mainly to a specific embodiment, those skilled in the art can apply various modifications to the embodiment described above in detailed configurations such as shapes, materials, quantity, and so on within the scope, the spirit, the technical concepts, or the object of the invention.

Accordingly, the descriptions limiting the shapes, the materials, and so on are provided as exemplification only for easier understanding of the invention, but not for limiting the invention. Therefore, descriptions with the names of the elements with a part or all of the limitations such as a shape or a material removed therefrom are included in the invention.

The embodiment of the invention capable of driving the cooling device even in the condition in which the power to be supplied from the external power supply to the projector is stopped while reducing the cost of the projector, can be applied to a projection system utilizing a projector applicable to presentation or a home theater.

The entire disclosure of Japanese Patent Application No. 2005-331450, filed Nov. 16, 2005 is expressly incorporated by reference herein.

What is claimed is:

1. A projection system comprising:
   an information processing device for processing image information;
   a projector for modulating a light beam emitted from a light source device in accordance with the image information processed by the information processing device and enlargedly projecting the modulated light beam; and
   an information transfer section for connecting the information processing device and the projector to each other so as to communicate information, wherein
   the information transfer section includes
      an electric power transmission path capable of supplying electric power from a processing device power supply section of the information processing device to the projector,
   the projector includes
      a light source device;
      a cooling device for cooling internal heat generator, and
      a power generation section that supplies at least the cooling device with a drive voltage based on the electric power supplied via the electric power transmission path, and supplies the light source device with a drive voltage based on electric power supplied from an external power supply when electric power is supplied from both the electric power transmission path and the external power supply,
   the information processing device includes
      a cooling device control section for generating a control instruction for performing drive control of the cooling device and for outputting the control instruction to the cooling device via the information transfer section,
   the external power supply is removeably connected to the projector, and
   when the electric power supplied from the external power supply is blocked and the drive voltage supplied from the power generation section to the light source device is stopped, the power generation section supplies only the cooling device with the drive voltage based on the electric power supplied from the electric power transmission path.

2. The projection system according to claim 1,
wherein
the projector includes a temperature detection section for detecting temperature in the vicinity of the heat generator,
the power generation section supplies the temperature detection section with the drive voltage based on the electric power supplied via the electric power transmission path, and
the cooling device control section obtains temperature information regarding the temperature in the vicinity of the heat generator detected by the temperature detection section via the information transfer section, generates the control instruction for performing drive control of the cooling device based on the temperature information, and outputs the control instruction to the cooling device via the information transfer section.

3. The projection system according to claim 1,
wherein
the projector includes a temperature detection section for detecting temperature in the vicinity of the heat generator,
the power generation section supplies the temperature detection section with the drive voltage based on the electric power supplied via the electric power transmission path,
the information processing device includes
   a necessary drive period calculation section for obtaining the temperature information regarding the temperature in the vicinity of the heat generator detected by the temperature detection section via the information transfer section, and for calculating a necessary drive period for driving the cooling device for cooling the heat generator based on the temperature information, and
   an annunciation control section for making an annunciation section announce information regarding the necessary drive period calculated by the necessary drive period calculation section.

4. The projection system according to claim 1,
wherein
the information processing device includes
   a setting input section for allowing setting input of state switching information between that the power generation section is set to an ON state and the projector is activated and that the power generation section is set to an OFF state and drive of the Projector is stopped, and
   a processing side power control section for generating a control instruction for setting the power generation section to one of the ON state and the OFF state based on the state switching information, and for outputting the control instruction to the power generation section via the information transfer section.

5. The projection system according to claim 1, wherein
the projector includes
 a projector side connection recognition section for recognizing whether or not the projector and the information processing device are connected to each other via the information transfer section, and
 a projector side power control section for making the power generation section supply the cooling device with the drive voltage based on the electric power supplied from the external power supply in response the projector side connection recognition section recognizing the unconnected state.

6. The projection system according to claim 5, wherein
the information processing device includes
 a processing device side connection recognition section for recognizing whether or not the information processing device and the projector are connected to each other via the information transfer section, and
 an annunciation control section for making an annunciation section announce information for maintaining electric power supplying state from the external power supply in response to the processing device side connection recognition section recognizing unconnected state.

7. A projector for modulating a light beam emitted from a light source device in accordance with image information processed by an information processing device and transferred via an information transfer section, and enlargedly projecting the modulated light beam,
the information transfer section including an electric power transmission path capable of supplying electric power from a processing device power supply section of the information processing device to the projector, the projector comprising:
 a light source cooling device;
 a cooling device for cooling internal heat generator; and
 a power generation section that supplies at least the cooling device with a drive voltage based on the electric power supplied via the electric power transmission path, and supplies the light source device with a drive voltage based on electric power supplied from an external power supply when electric power is supplied from both the electric power transmission path and the external power supply;
wherein
the cooling device is driven based on a control instruction transferred from the information processing device via the information transfer section
the external power supply is removeably connected to the projector, and
when the electric power supplied from the external power supply is blocked and the drive voltage supplied from the power generation section to the light source device is stopped, the power generation section supplies only the cooling device with the drive voltage based on the electric power supplied from the electric power transmission path.

8. The projector according to claim 7, further comprising:
 a projector side connection recognition section for recognizing whether or not the projector and the information processing device are connected to each other via the information transfer section; and
 a projector side power control section for making the power generation section supply the cooling device with the drive voltage based on the electric power supplied from the external power supply in response the projector side connection recognition section recognizing the unconnected state.

9. An information processing device for processing image information and transferring the processed image information to a projector via an information transfer section,
the information transfer section including an electric power transmission path capable of supplying electric power from a processing device power supply section of the information processing device to the projector,
the projector including a light source device, a cooling device for cooling an internal heat generator, and a power generation section that supplies at least the cooling device with a drive voltage based on the electric power supplied via the electric power transmission path, and supplies the light source device with a drive voltage based on the electric power supplied from an external power supply in case the when electric power is supplied from both the electric power transmission path and the external power supply,
the information processing device comprising:
 a cooling device control section for generating a control instruction for performing drive control of the cooling device and for outputting the control instruction to the cooling device via the information transfer section,
the external power supply is removeably connected to the projector, and
when the electric power supplied from the external power supply is blocked and the drive voltage supplied from the power generation section to the light source device is stopped, the power generation section supplies only the cooling device with the drive voltage based on the electric power supplied from the electric power transmission path.

10. The information processing device according to claim 9,
the projector including a temperature detection section for detecting temperature in the vicinity of the heat generator,
the power generation section supplying the temperature detection section with the drive voltage based on the electric power supplied from the processing device power supply section via the electric power transmission path, and
the information processing device comprising:
 a necessary drive period calculation section for obtaining the temperature information regarding the temperature in the vicinity of the heat generator detected by the temperature detection section via the information transfer section, and for calculating a necessary drive period for driving the cooling device for cooling the heat generator based on the temperature information; and
 an annunciation control section for making an annunciation section announce information regarding the necessary drive period calculated by the necessary drive period calculation section.

11. The information processing device according to claim 9, comprising:
 a setting input section for allowing setting input of state switching information between that the power generation section is set to an ON state and the projector is activated and that the power generation section is set to an OFF state and drive of the projector is stopped; and a processing device side power control section for generating a control instruction for setting the power generation section to one of the ON state and the OFF state based on the state switching information, and for outputting the control instruction to the power generation section via the information transfer section.

12. The information processing device according to claim 9, the projector including
a projector side connection recognition section for recognizing whether or not the projector and the information processing device are connected to each other via the information transfer section, and
a projector side power control section for making the power generation section supply the cooling device with the drive voltage based on the electric power supplied from the external power supply in response the projector side connection recognition section recognizing the unconnected state, the information processing device comprising:
a processing device side connection recognition section for recognizing whether or not the information processing device and the projector are connected to each other via the information transfer section; and
an annunciation control section for making an annunciation section announce information for maintaining electric power supplying state from the external power supply in response to the processing device side connection recognition section recognizing unconnected state.

* * * * *